United States Patent
Han et al.

(10) Patent No.: US 12,241,557 B2
(45) Date of Patent: Mar. 4, 2025

(54) CHECK VALVE FOR CRYOGENIC FLUID

(71) Applicant: DONG-A UNIVERSITY RESEARCH FOUNDATION FOR INDUSTRY-ACADEMY COOPERATION, Busan (KR)

(72) Inventors: Seungho Han, Seoul (KR); Hyolim Kang, Busan (KR); Juhyang Park, Busan (KR); Haeseong Hwang, Busan (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 0 days.

(21) Appl. No.: 18/271,607

(22) PCT Filed: Dec. 8, 2021

(86) PCT No.: PCT/KR2021/018517
§ 371 (c)(1),
(2) Date: Jul. 10, 2023

(87) PCT Pub. No.: WO2022/177112
PCT Pub. Date: Aug. 25, 2022

(65) Prior Publication Data
US 2024/0052937 A1    Feb. 15, 2024

(30) Foreign Application Priority Data
Feb. 22, 2021  (KR) .................. 10-2021-0023656

(51) Int. Cl.
*F16K 15/03* (2006.01)
*F16K 47/02* (2006.01)

(52) U.S. Cl.
CPC .......... *F16K 15/034* (2021.08); *F16K 47/023* (2013.01)

(58) Field of Classification Search
CPC .... F16K 15/033; F16K 15/034; F16K 1/2057; F16K 1/2071; F16K 1/2263; F16K 1/2266; F16K 47/023
See application file for complete search history.

(56) References Cited

U.S. PATENT DOCUMENTS 4,088,299 A * 5/1978 Maciulaitis ........... F16K 1/2266
                                                                    251/173
4,208,035 A * 6/1980 Alvarez ................. F16K 3/0236
                                                                    251/328

(Continued)

FOREIGN PATENT DOCUMENTS

CN     208703196 U        4/2019
CN     110953355 A  *    4/2020

(Continued)

OTHER PUBLICATIONS

Machine English translation of CN110953355 (Year: 2024).*

(Continued)

*Primary Examiner* — Hailey K. Do
(74) *Attorney, Agent, or Firm* — Paratus Law Group, PLLC

(57) ABSTRACT

A check valve for cryogenic fluid includes: a valve body which is formed to have an inlet and an outlet open at both ends thereof; a valve seat which is formed inside the valve body to communicate with the inlet; a disk which is pivoted up and down at the upper end thereof about a pivot axis provided in the valve body to open and close the valve seat; and a sealing member which is made of a metal material shrinkable by cryogenic fluid introduced through the inlet, is provided in the circumferential direction of the valve seat, (Continued)

and when the disk closes the valve seat, is brought into close contact with the edge portion of the disk to produce sealing effects.

3 Claims, 4 Drawing Sheets

(56) References Cited

U.S. PATENT DOCUMENTS

| | | | |
|---|---|---|---|
| 4,513,765 A | | 4/1985 | Rishovd et al. |
| 4,556,083 A | * | 12/1985 | Schleiter, Sr. ...... F16K 17/0446 251/303 |
| 4,582,080 A | * | 4/1986 | Stock .................... F16K 1/2266 251/173 |
| 2012/0228537 A1 | * | 9/2012 | Kahn ................... F16K 3/0227 251/328 |

FOREIGN PATENT DOCUMENTS

| | | | | |
|---|---|---|---|---|
| EP | 0498315 A2 | * | 8/1992 | |
| IT | 1049841 B | * | 2/1981 | ........... F16K 1/2285 |
| JP | H10-061798 A | | 3/1998 | |
| JP | H11-166638 A | | 6/1999 | |
| KR | 20-2009-0004912 U | | 5/2009 | |
| KR | 20200117537 A | * | 10/2020 | |
| SU | 1565354 A3 | * | 5/1990 | |
| WO | WO-9520735 A1 | * | 8/1995 | ............. E03C 1/104 |
| WO | WO-9618054 A1 | * | 6/1996 | ........... F16K 15/033 |
| WO | WO-2011076992 A1 | * | 6/2011 | ................ F16J 15/52 |
| WO | WO-2019067725 A1 | * | 4/2019 | ............. F16J 15/025 |

OTHER PUBLICATIONS

Machine English translation of IT1049841 (Year: 2024).*
Machine English translation of KR20200117537 (Year: 2024).*
Machine English translation of SU1565354 (Year: 2024).*
Machine English translation of WO9520735 (Year: 2024).*
Machine English translation of WO9618054 (Year: 2024).*
International Search Report for PCT/KR2021/018517 mailed Apr. 27, 2022 from Korean Intellectual Property Office.
Korean Office Action for related KR Application No. 10-2021-0023656 mailed Apr. 15, 2022 from Korean Intellectual Property Office.

* cited by examiner

CHECK VALVE FOR CRYOGENIC FLUID

CROSS-REFERENCE TO PRIOR APPLICATIONS

This application is a National Stage Application of PCT International Patent Application No. PCT/KR2021/018517 (filed on Dec. 8, 2021), which claims priority to Korean Patent Application No. 10-2021-0023656 (filed on Feb. 22, 2021), which are all hereby incorporated by reference in their entirety.

BACKGROUND

The present disclosure relates to a check valve, and, more particularly, to a check valve for cryogenic fluid that controls the flow of cryogenic fluid such as cryogenic liquid hydrogen, hydrogen gas, or liquid nitrogen.

A check valve is installed in a pipe through which fluid passes and controls the flow of the fluid by preventing the reverse flow of the fluid flowing inside the pipe and allowing the fluid to flow only in one direction. The check valve is opened by the pressure of the fluid when the fluid is flowing normally inside the pipe, and automatically closes when the fluid flows backward due to a malfunction of a pump or other reasons, blocking the reverse flow of the fluid.

Such a check valve does not require any external driving force as it is operated only by fluid in a pipe. The check valve protects devices that may be affected by backflow, such as flow meters, pumps, and control valves, and blocks pressure surges related to water hammers. In addition, when a system is shut down, the check valve prevents reverse flow and overflow and relieves a vacuum condition.

In the meantime, in the case of a check valve for cryogenic fluid used for pipes or devices where cryogenic fluids such as hydrogen gas flow (e.g., hydrogen compressors, etc.), when a seat sealing in close contact with a disk that opens and closes a flow path is made of an elastic material such as rubber or silicone, it is rapidly hardened and damaged by cryogenic fluid. Therefore, in order to prevent fluid leakage, a copper O-ring is provided outside a metal seal, and a stainless O-ring and an Inconel spring are inserted thereinto, enabling the metal seal to move elastically.

However, a seat sealing structure of a conventional check valve for cryogenic fluid is expensive to manufacture and has a problem of being vulnerable to high pressure.

SUMMARY

The present disclosure is intended to solve the aforementioned problem, and the purpose of the present disclosure is to provide a check valve for cryogenic fluid that is structurally simple, inexpensive to manufacture, and deformed by cryogenic fluid to provide reliable sealing effects.

Another purpose of the present disclosure is to provide a check valve for cryogenic fluid that is capable of preventing shock and chattering caused by fluid pressure when a disk opens a flow path.

To achieve the above-mentioned purposes, a check valve for cryogenic fluid according to an aspect of the present disclosure includes: a valve body formed to have an inlet and an outlet open at the both ends thereof, a valve seat formed inside the valve body to communicate with the inlet; a disk pivoted up and down at the upper end thereof around a pivot axis provided in the valve body to open and close the valve seat; and a sealing member that is made of metal contracted and deformed by cryogenic fluid introduced through the inlet, is provided in the circumferential direction of the valve seat, and, when the disk closes the valve seat, is brought into close contact with the edge portion of the disk to produce sealing effects.

The sealing member includes a fixing part fixed by being press-fitted into a groove concavely formed at the valve seat and an elastic sealing part that extends outwardly from the fixing part and protrudes out of the groove to be elastically deformed while being in close contact with the surface of the disk, and the elastic sealing part is contracted and deformed by cryogenic fluid to be spaced apart from the inner surface of the groove so that the cryogenic fluid flows into the groove to apply pressure to the elastic sealing part in an outward direction.

The elastic sealing part has a bent V or S shape.

The sealing member further includes a pressure ring that is made of metal, is coupled to the elastic sealing part in a circumferential direction, and increases the contact pressure between the elastic sealing part and the surface of the disk while being contracted and deformed.

The check valve for cryogenic fluid according to the present disclosure further includes an insulating pocket in the shape of a pocket installed on the rear surface of the disk and an elastic member installed inside the insulating pocket to provide elastic force to the disk so that the disk is elastically in contact with the upper end of the valve body when rotating upward to open the valve seat.

A check valve for cryogenic fluid according to another aspect of the present disclosure includes: a valve body formed to have an inlet and an outlet open at the both ends thereof, a valve seat formed inside the valve body to communicate with the inlet; a disk pivoted up and down at the upper end thereof around a pivot axis provided in the valve body to open and close the valve seat; an insulating pocket in the shape of a pocket installed on the rear surface of the disk; and an elastic member installed inside the insulating pocket to provide elastic force to the disk so that the disk is elastically in contact with the upper end of the valve body when rotating upward to open the valve seat.

The check valve for cryogenic fluid according to the present disclosure further includes a sealing member that is made of metal contracted and deformed by cryogenic fluid introduced through the inlet, is provided in the circumferential direction of the valve seat, and, when the disk closes the valve seat, is brought into close contact with the edge portion of the disk to produce sealing effects.

The sealing member includes a fixing part fixed by being press-fitted into a groove concavely formed at the valve seat and an elastic sealing part that extends outwardly from the fixing part and protrudes out of the groove to be elastically deformed while being in close contact with the surface of the disk, and the elastic sealing part is contracted and deformed by cryogenic fluid to be spaced apart from the inner surface of the groove so that the cryogenic fluid flows into the groove to apply pressure to the elastic sealing part in an outward direction.

The elastic sealing part has a bent V or S shape.

The sealing member further includes a pressure ring that is made of metal, is coupled to the elastic sealing part in a circumferential direction, and increases the contact pressure between the elastic sealing part and the surface of the disk while being contracted and deformed.

According to the present disclosure, it may be possible to enhance the capability of sealing fluids because a sealing member made of metal such as the SUS 316 is thermally contracted and deformed by cryogenic fluid and strongly adheres to a disk.

In addition, it may be possible to simplify the structure of a sealing member and reduce the manufacturing cost therefor.

It may be possible to prevent damage to a disk, vibration, noise, and chattering because an insulating pocket and an elastic member are installed on the rear surface of the disk to serve as a buffer when the disk is rapidly opened by the pressure of fluid and thus hits the upper end of a valve body hard.

DETAILED DESCRIPTION

Figure 1:
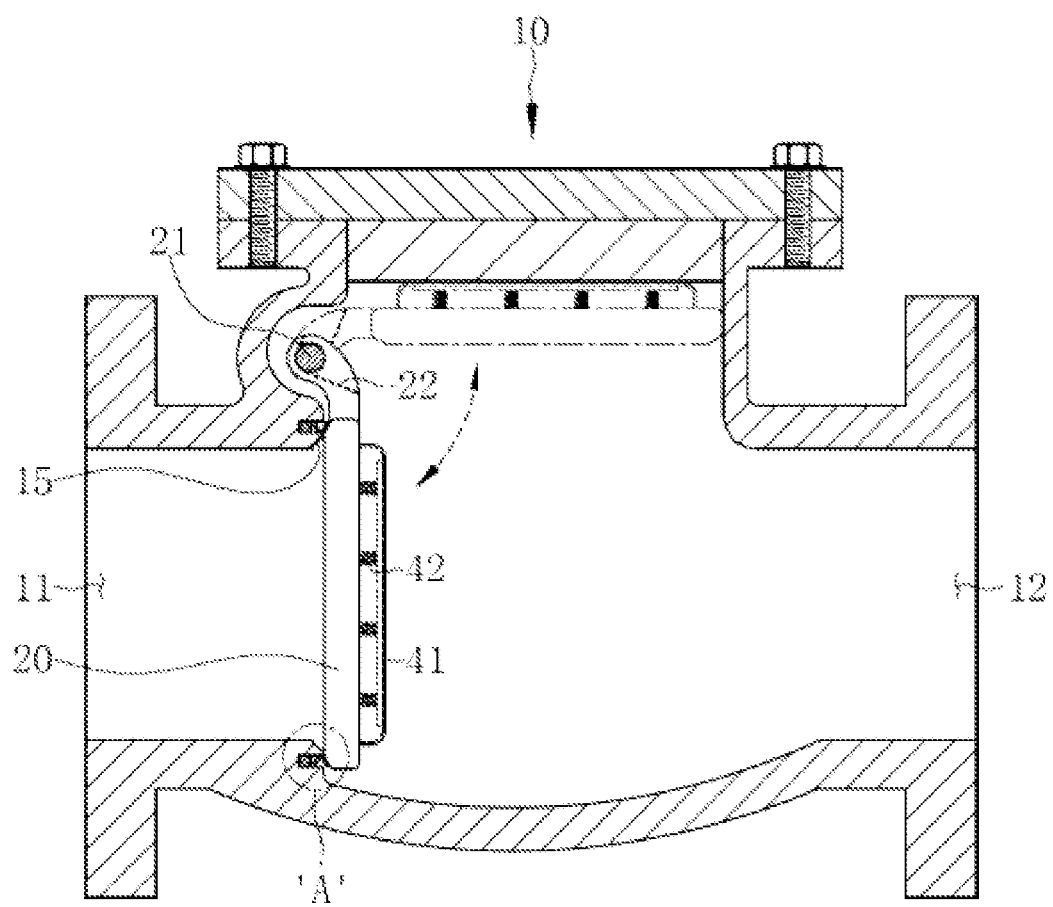
FIG. 1 is a cross-sectional view of a check valve for cryogenic fluid according to an embodiment of the present disclosure.
Figure 2:
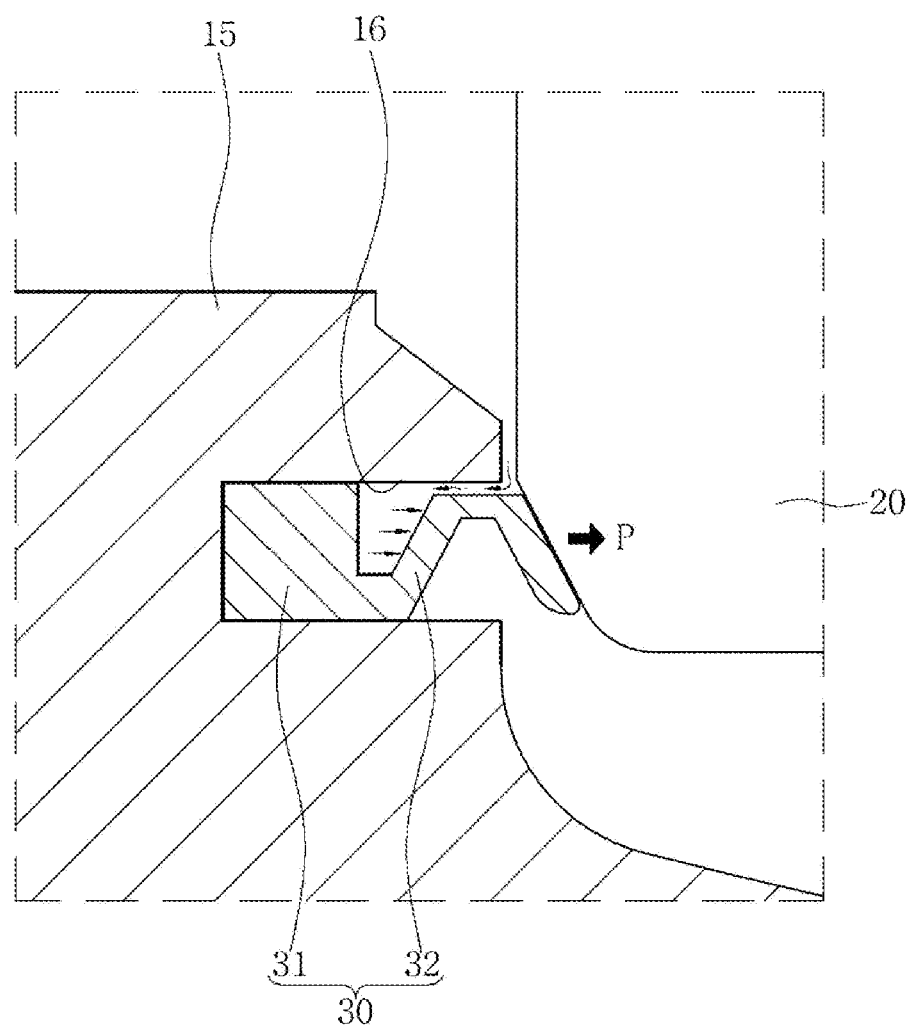
FIG. 2 is an enlarged view of part A in FIG. 1.

The embodiments described in the present specification and the components shown in the accompanying drawings are merely desirable examples of the present disclosure, and there may be various modified examples that can replace the embodiments in this specification and the drawings at the time of filing of the present application.

Hereinafter, a check valve for cryogenic fluid will be described in detail according to the following embodiments with reference to the appended drawings. The same reference numbers in the drawings indicate the same components.

Figure 3:
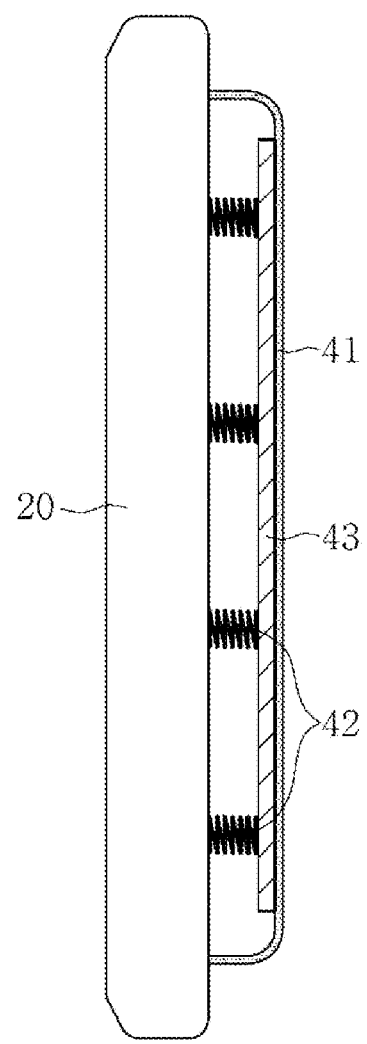
FIG. 3 is a cross-sectional view of some components of the check valve for cryogenic fluid shown in FIG. 1.

FIGS. 1 and 3 show a check valve for cryogenic fluid according to an embodiment of the present disclosure, and the check valve for cryogenic fluid may include a valve body 10 formed to have an inlet 11 and an outlet 12 open at the both ends thereof, a valve seat 15 formed inside the valve body 10 to communicate with the inlet 11, a disk 20 that may be pivoted up and down at the upper end thereof around a pivot axis 21 provided in the valve body 10 to open and close the valve seat 15, a sealing member 30 that may be brought into close contact with the edge portion of the disk 20 to produce sealing effects when the disk 20 closes the valve seat 15, an insulating pocket 41 in the shape of a pocket installed on the rear surface of the disk 20, and an elastic member 42.

The valve seat 15 may be disposed between the inlet 11 and the outlet 12 of the valve body 10, and the disk 20 may be installed right behind the valve seat 15 to rotate up and down around the pivot axis 21 at the top. The disk 20 may have a disk shape of a size corresponding to the size of the valve seat 15, and may open and close the opening of the valve seat 15 while rotating up and down around the pivot axis 21 by the pressure of fluid. The disk 20 may be designed to have a size determined considering heat shrinkage caused by cryogenic fluid.

A torsion coil spring 22 may be installed on the outer circumferential surface of the pivot axis 21 coupled to the upper end of the disk 20 to provide elastic force to the disk 20 downward, so that the disk 20 may be quickly rotated downward when the back pressure of fluid occurs and may remain in close contact with the sealing member 30 when closing the opening of the valve seat 15.

In addition, the front edge of the disk 20 may be in elastic contact with the sealing member 30 installed on the valve seat 15 to prevent leakage of fluid between the disk 20 and the valve seat 15, and it may be desirable that the front edge of the disk 20 may be inclined at a certain angle from the inside to the outside in a radial direction toward the rear in order to enhance the contact pressure between the sealing member 30 and the front edge of the disk 20.

The sealing member 30 may be made of metal that is contracted and deformed by cryogenic fluid flowing into the valve body 10 through the inlet 11, and may be installed inside a groove 16 formed at the valve seat 15 in a circumferential direction. The sealing member 30 may be made of stainless steel such as the SUS316 that can be deformed by cryogenic fluid.

In addition, in order to improve the ability to seal of the sealing member 30, the sealing member 30 may include a fixing part 31 fixed by being press-fitted into the groove 16 concavely formed at the valve seat 15 and an elastic sealing part 32 that extends outwardly from the fixing part 31 and protrudes out of the groove 16 to be elastically deformed while being in close contact with the surface of the disk 20.

The elastic sealing part 32 may be formed in a bent V or S shape. The elastic sealing part 32 may remain in close contact with the inner surface of the groove 16 at room temperature, may be contracted and deformed by cryogenic fluid to be spaced apart from the inner surface of the groove 16 so that the cryogenic fluid may flow into the groove 16, and may be pressed toward the disk 20 by the pressure of the fluid introduced into the groove 16 to adhere to the front edge of the disk 20 with high pressure. The fixing part 31 and the elastic sealing part 32 may be integrally formed.

As such, as the elastic sealing part 32 of the sealing member 30 is thermally contracted and deformed by cryogenic fluid, the contact pressure with the disk 20 may increase, thereby preventing leakage of the cryogenic fluid. Furthermore, since the sealing member 30 may be made of metal such as the SUS 316, it may be possible to use the sealing member 30 semi-permanently without damaging the sealing member 30.

Figure 4:
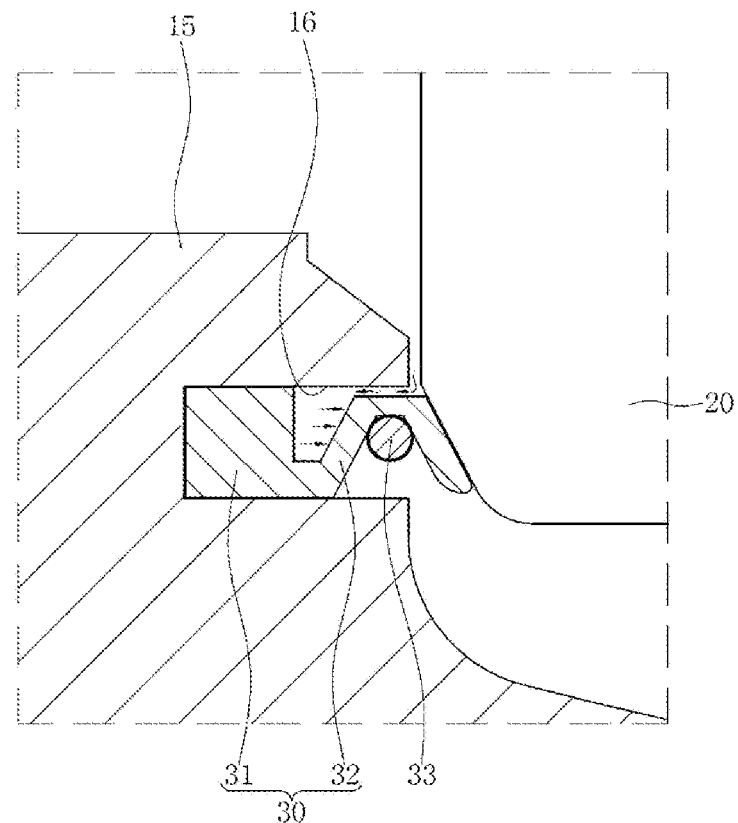
FIG. 4 is a cross-sectional view of a main part of a check valve for cryogenic fluid according to another embodiment of the present disclosure.
Figure 5:
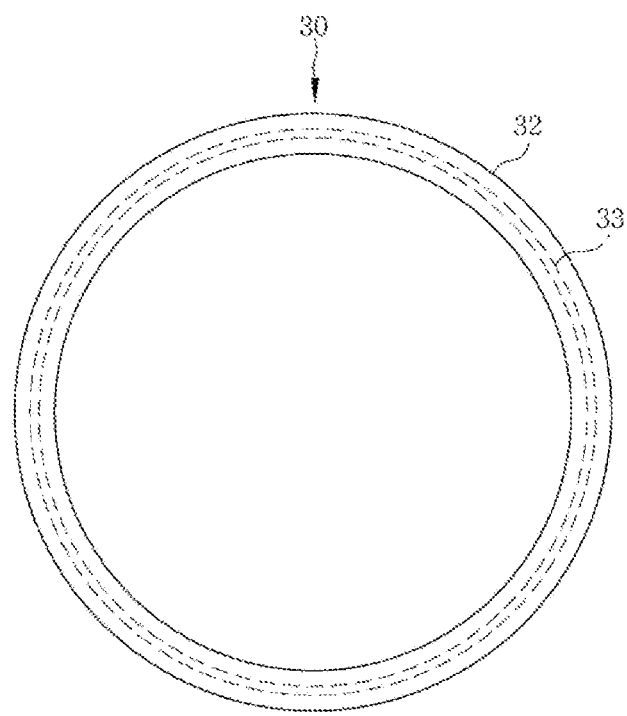
FIG. 5 is a front view of a sealing member of the check valve for cryogenic fluid shown in FIG. 4.

In order to increase the contact pressure between the sealing member 30 and the surface of the disk 20, as shown in FIGS. 4 and 5, a circular pressure ring 33 made of metal such as the SUS 316 may be coupled to the elastic sealing part 32 in a circumferential direction. As the pressure ring 33 is installed along the circumference of the elastic sealing part 32 as described above and is contracted and deformed by cryogenic fluid, it may press the elastic sealing part 32 in a radial direction so that the end of the elastic sealing part 32 may be brought into close contact with the front edge of the disk 20 with stronger pressure.

In the meantime, when the disk 20 is rapidly opened by the pressure of fluid, the rear surface of the disk 20 may strongly hit the upper end of the valve body 10, thereby causing damage to the disk 20, vibration, and noise. In addition, when fluid flows while the disk 20 is open, the disk 20 may intermittently collide with the upper end of the valve body 10, so that chattering may occur.

In order to prevent this, as shown in FIG. 3, the insulating pocket 41 in the shape of a pocket may be installed on the back of the disk 20, and the elastic member 42 may be installed inside the insulating pocket 41 to provide elastic force to the disk 20 so that the disk 20 may elastically be in contact with the upper end of the valve body 10 when rotating upward to open the valve seat 15.

The insulating pocket 41 may be made of polyurethane foam having excellent insulation properties, and a support plate 43 in the shape of a thin and light plate may be installed inside the insulating pocket 41 in order to support the elastic member 42.

The elastic member 42 may be formed by applying a compression coil spring, but a plate spring or an elastic body made of rubber may also be applied. Because the elastic member 42 may be sealed by and installed inside the insulating pocket 41, it may be hardly affected by cryogenic fluid, so that it may be possible to prevent deterioration of the elastic force of the elastic member 42 and reduction in life span thereof.

In the case of such a check valve for cryogenic fluid according to the present disclosure, since the sealing member 30 made of metal such as the SUS 316 may be thermally contracted and deformed by cryogenic fluid to adhere to the disk 20 strongly, the capability of sealing fluid may be improved.

In addition, the insulating pocket 41 and the elastic member 42 may be installed on the rear surface of the disk 20 to serve as a buffer when the disk 20 is rapidly opened by the pressure of fluid and thus hits the upper end of the valve body 10 hard, thereby preventing damage to the disk 20, vibration, noise, and chattering.

The check valve for cryogenic fluid according to the present disclosure may be installed at an inlet of a pipe for injecting hydrogen gas into a cylinder of a hydrogen compressor.

Although the present disclosure has been described in detail with reference to the examples above, it is needless to say that a person having ordinary skills in the technical field to which the present disclosure belongs may be able to make various substitutions, additions, and modifications within the above-described technology, and it should be understood that such modified embodiments are also within the scope of the present disclosure, which is defined by the claims below.

The present disclosure can be applied to a check valve for cryogenic fluid that controls the flow of cryogenic fluid such as cryogenic liquid hydrogen, hydrogen gas, or liquid nitrogen.

The invention claimed is:

1. A check valve for cryogenic fluid, comprising:
a valve body, which is open at both ends thereof and formed to have an inlet and an outlet;
a valve seat formed inside the valve body to communicate with the inlet;
a disk pivoted up and down at an upper end thereof around a pivot axis provided in the valve body to open and close the valve seat;
a valve seat seal made of metal contracted and deformed by cryogenic fluid introduced through the inlet, and provided in a circumferential direction of the valve seat, wherein the valve seat seal is configured to bring into close contact with an edge portion of the disk to produce sealing effects when the disk closes the valve seat;
an insulating pocket fixedly attached to a rear surface of the disk, being made of polyurethane foam to insulate an internal space thereof, and configured to directly contact an upper end of the valve body when the disk is rapidly opened due to a pressure of the cryogenic fluid;
an elastic buffer positioned within the insulating pocket and configured to absorb impact generated when the insulating pocket hits the upper end of the valve body as a result of a rapid opening of the disk; and
a support plate positioned within the insulating pocket between the insulating pocket and the elastic buffer to support the elastic buffer.

2. The check valve for cryogenic fluid of claim 1, wherein the valve seat seal includes a fixing base fixed by being press-fitted into a groove concavely formed at the valve seat and an elastic seal that extends outwardly from the fixing base and protrudes out of the groove to be elastically deformed while being in close contact with a surface of the disk, wherein the elastic seal is configured to be in close contact with an inner surface of the groove at room temperature and to contract and deform by cryogenic fluid to be spaced apart from the inner surface of the groove so that the cryogenic fluid, introduced through the inlet, flows into a space defined between the elastic buffer and the inner surface of the groove to apply pressure to the elastic seal in an outward direction to press an end portion of the valve seat seal into close contact with the edge portion of the disk.

3. The check valve for cryogenic fluid of claim 2, wherein the elastic sealing part has a bent V or S shape.

* * * * *